United States Patent
Deimerly

(10) Patent No.: US 9,766,259 B2
(45) Date of Patent: Sep. 19, 2017

(54) COMPACT DEVICE FOR DETECTING AT LEAST ONE ACCELERATION AND ONE SPEED OF ROTATION

(71) Applicant: COMMISSARIAT A L'ENERGIE ATOMIQUE ET AUX ENE ALT, Paris (FR)

(72) Inventor: Yannick Deimerly, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 312 days.

(21) Appl. No.: 14/379,129

(22) PCT Filed: Feb. 14, 2013

(86) PCT No.: PCT/EP2013/053017
§ 371 (c)(1),
(2) Date: Aug. 15, 2014

(87) PCT Pub. No.: WO2013/120968
PCT Pub. Date: Aug. 22, 2013

(65) Prior Publication Data
US 2015/0013455 A1    Jan. 15, 2015

(30) Foreign Application Priority Data

Feb. 15, 2012  (FR) ..................................... 12 51395

(51) Int. Cl.
G01P 3/44        (2006.01)
G01C 19/5747     (2012.01)
G01P 15/12       (2006.01)

(52) U.S. Cl.
CPC ............ G01P 3/44 (2013.01); G01C 19/5747 (2013.01); G01P 15/123 (2013.01)

(58) Field of Classification Search
CPC ...... G01P 3/44; G01P 15/123; G01C 19/5747
See application file for complete search history.

(56) References Cited

U.S. PATENT DOCUMENTS

| | | |
|---|---|---|
| 5,691,471 A | 11/1997 | Okazaki et al. |
| 2002/0189354 A1 | 12/2002 | Durante et al. |
| 2003/0183007 A1 | 10/2003 | Willig et al. |
| 2007/0144254 A1 | 6/2007 | Handrich |
| 2012/0011933 A1 | 1/2012 | Ohms et al. |

(Continued)

FOREIGN PATENT DOCUMENTS

| | | |
|---|---|---|
| DE | 10 2010 029 630 A1 | 12/2011 |
| EP | 1 253 399 A1 | 10/2002 |

(Continued)

OTHER PUBLICATIONS

International Search Report issued Jun. 12, 2013, in PCT/EP13/053017 filed Feb. 14, 2013.

(Continued)

Primary Examiner — Erika J Villaluna
(74) Attorney, Agent, or Firm — Oblon, McClelland, Maier & Neustadt, L.L.P.

(57) ABSTRACT

A device for detecting an acceleration in one direction and a speed of rotation along one direction, including a support and two structures mechanically coupled to each other in opposite phase and suspended relative to the support, each of the structures including: an excitation mass; an excitation mechanism configured to move the excitation mass in a given direction; an inertial mass suspended to the excitation mass; a detector connected to the inertial mass to be displaced by same, and the detector connected to the support; a mechanism for detecting displacement of the inertial mass; and a controller controlling the excitation mechanism and processing signals delivered by the detecting mechanism.

27 Claims, 12 Drawing Sheets

(56) References Cited

U.S. PATENT DOCUMENTS

| 2012/0061172 | A1 | 3/2012 | Yacine |
| 2013/0104651 | A1* | 5/2013 | Li ..................... G01C 19/5762 73/504.12 |
| 2014/0318906 | A1 | 10/2014 | Deimerly et al. |

FOREIGN PATENT DOCUMENTS

| WO | WO 02/066927 A1 | 8/2002 |
| WO | WO 2005/000665 A1 | 1/2005 |
| WO | WO 2005/066584 A1 | 7/2005 |
| WO | WO 2010/130765 A1 | 11/2010 |

OTHER PUBLICATIONS

French Preliminary Search Report issued Nov. 7, 2012 in Patent Application No. FR 1251395 (with English translation of categories of cited documents).

Yoshiyuki Watanabe, et al., Five-axis motion sensor with electrostatic drive and capacitive detection fabricated by silicon bulk micromachining Sensors and Actuators A, vol. 97-98, 2002, pp. 109-115.

Ranjith Amarasinghe, et al., "Development of miniaturized 6-axis accelerometer utilizing piezoresistive sensing elements" Sensors and Actuators A, vol. 134, 2007, pp. 310-320.

Nan-Chyuan Tsai, et al., "Fabrication and analysis of a micromachined tri-axis gyroscope" Journal of Micromechanics and Microengineering, vol. 18, 2008, 14 pages.

Heng Yang, et al., "Two-dimensional excitation operation mode and phase detection scheme for vibratory gyroscopes" Journal of Micromechanics and Microengineering, vol. 12, 2002, 6 pages.

Yoshiyuki Watanabe, et al., "SOI micromachined 5-axis motion sensor using resonant electrostatic drive and non-resonant capacitive detection mode" Sensors and Actuators A, vol. 130-131, 2006, pp. 116-123.

* cited by examiner

COMPACT DEVICE FOR DETECTING AT LEAST ONE ACCELERATION AND ONE SPEED OF ROTATION

TECHNICAL FIELD AND PRIOR ART

The present invention relates to a device for detecting at least one acceleration and one speed of rotation having a compact design and simplified electronics.

There are inertial units having five axes of detection, three axes in acceleration and two axes in rotation. Such a unit is described in document Y. Watanabe et al, *"Five axis motion sensor with electrostatic drive and capacitive detection fabricated with silicon bulk micromachining"*, Sensors and Actuators A, Vol 97-98, p 109-115, 2002. On the one hand, this unit is made in the volume technology, which makes its manufacture long and expensive. On the other hand, the detection of all the axes of detection and the excitation are intricate. The data processing is thus complex and there is a high risk of introducing errors, this being all the higher that the air-gap variation capacity detection is non-linear, this non-linearity being amplified when the movements are of a strong amplitude, which is the case of the excitation movements. Further, the measurement accuracy is all the higher that the capacitive air-gap is low, but the actuation requires high air-gaps to achieve significant amplitudes.

Document U.S. Pat. No. 5,691,471 describes a sensor able to measure the acceleration in the three space directions and the speed of rotation along the space directions. The sensor comprises an inertial mass suspended to four suspension arms. The detection of the mass displacements is achieved by gauges implanted on the suspension arms.

This sensor is made by means of a stack of several substrates. The implementation of implanted gauges has the drawback of having a great sensitivity to the stress.

Document WO2005/066584 describes a gyroscope capable of measuring an acceleration only in the plane and a speed of rotation about an axis perpendicular to the plane.

DISCLOSURE OF THE INVENTION

Consequently, one object of the present invention is to provide an inertial unit able to measure at least one acceleration and at least one speed of rotation, wherein the acceleration can be out-of-plane and the speed of rotation can be about an axis non-perpendicular to the plane, the unit being of compact design and simplified electronics and easily made.

The aforementioned object is achieved by an inertial unit comprising a substrate and at least two moveable masses with respect to the substrate, said masses being mechanically coupled so as to be in opposite phase, the moveable mass being in two parts, means for exciting one of the parts of each moveable mass and means for detecting the displacement of the other part of each moveable mass, the detecting means comprising a detecting element hinged to the substrate by a pivot connection and connected to the moveable part the displacement of which is desired to be detected by elastic means.

A device is made wherein the measurement of an acceleration is used as a reliable datum measurable by the same elements as those measuring the speed of rotation, whereas in sensors of the state of the art, it is attempted to make devices which, when measuring the acceleration, are not very sensitive to the speed of rotation and conversely.

Thanks to the invention, the same inertial masses are used to measure both the acceleration and speed of rotation. Thus, measurement devices having a compact design can be made. Further, as a result, the same reading electronics can be used to measure the acceleration and speed of rotation. Thus, the device cost is reduced. Besides, the selection of a pivot hinge and elastic means enables the detecting means to be projected outwardly from the masses and measurements of acceleration and speed of rotation to be made out-of-plane.

The implementation of elastic means between the detecting element and the moveable mass the displacement of which is desired to be detected enables the movements along the direction of detection to be mostly transmitted to the detecting element.

In a particularly advantageous example, the detecting element comprises two portions hinged with respect to each other by means of a pivot connection. This example provides an increased sensitivity.

By combining several of these devices, accelerations and speeds of rotation can be measured along several space directions. Advantageously, they can use the same excitation loop, which reduces the power consumption.

The inertial unit is advantageously made as a microelectromechanical and/or nanoelectromechanical system, wherein this unit can be made by so called surface technologies.

Therefore, one subject-matter of the present invention is a device for detecting an acceleration in at least one direction and a speed of rotation in at least one other direction, comprising a support and at least two structures mechanically coupled to each other in opposite phase, said structures being suspended relative to the support, each of the structures comprising:
  an excitation mass,
  excitation means able to move said excitation mass in a given direction called a direction of excitation,
  an inertial mass mechanically integral with the excitation mass,
  a detecting element connected to the inertial mass so as to be displaced by the inertial mass, said detecting element being hinged to the support by means of a pivot hinge and connected to the inertial mass by elastic means,
  means for detecting the displacement of said inertial mass in a given direction called a direction of detection, and
  a unit for controlling the excitation means and for processing signals delivered by the detecting means.

The direction of excitation and the direction of detection are orthogonal to each other. Besides, the direction of excitation and the direction of detection can be either in the support plane or in a plane perpendicular to the same. Thus, if the support plane is defined by the axes X and Y and the direction perpendicular to this plane is defined as Z, if the direction of excitation is along direction X (respectively Y or Z), the direction of detection will then be along direction or Z (respectively X or Z or even x or Y).

Thus, the speed of rotation detected by the device of the invention is perpendicular to the direction of detection as well as the direction of excitation and the direction of the acceleration detected corresponds to the direction of detection.

In an exemplary very advantageous embodiment, the detecting element comprises a first portion and a second portion which are connected by a pivot connection, the first portion being hinged to the support by the pivot connection and the second portion being connected to the inertial mass by the elastic means, the pivot connection between the first and second portions having an axis parallel to that of the pivot connection between the support and the first portion.

In an exemplary embodiment, advantageously, both structures are mechanically coupled in opposite phase by a rhomb-shaped connection, said structures being connected at two vertices thereof connected by a diagonal of said rhomb.

In an advantageous example, the detecting device comprises elastic means anchored to the support and connected to the detecting element.

The detecting element of each structure can be connected to the support by a mechanical connection or it can be facing the support so as to induce a capacitive coupling with the detecting means.

In an exemplary embodiment, each excitation mass is in the shape of a frame inside which is suspended the inertial mass and wherein the detecting element is an arm connected to the inertial mass.

In an embodiment, each inertial mass and the detecting element associated therewith are connected so as to mostly transmit movements along the direction of detection to the detecting element, said inertial masses being configured to be displaced along a direction contained in a neutral plane of the detecting device. For example, at least one pivot connection between the detecting element and the support is formed by two flexible beams in the plane, attached by one end to the support at two distinct points and by another end to the detecting element and defining the pivot axis at the intersection of the axis of the flexible beams.

In another embodiment, each inertial mass and the detecting element associated therewith are connected so as to mostly transmit movements in the direction of detection to the detecting element, said inertial masses being configured to be displaced along a direction perpendicular to a neutral plane of the detecting device. At least one pivot connection between the detecting element and the support is an out-of-plane pivot connection formed by a beam attached on the one hand to the detecting element and one the other hand by two ends to the support.

For example, the detecting means comprise at least one piezoresistive gauge connected to the detecting element. Advantageously, the detecting means comprise two piezoresistive gauges mounted as a differential.

Advantageously, the gauge(s) is (are) for example connected to the detecting part in the zone of the pivot connection.

In another example, the detecting means are of the capacitive type, and comprise at least one electrode, the detecting element forming with said electrode a variable capacitor. Alternatively, the capacitive means can be formed by interdigitated combs, with the combs forming the detecting element.

The detecting means can advantageously comprise two electrodes between which is accommodated the detecting element, the detecting element forming with each of said electrodes a variable capacitor mounted as a differential.

The capacitive detection means are advantageously located opposite the pivot connection with respect to the inertial mass.

The excitation means can be of the electrostatic type comprising at least one pair of interdigitated combs per excitation mass, a comb being on the support and another comb being integral with the excitation mass.

The unit for controlling the means for exciting and processing the signals delivered by the detecting means comprises means for demodulating said signals and means for summing and subtracting said demodulated signals.

In the case where the direction of excitation is out-of-plane, the signals delivered by the detecting means enable the signals corresponding to the acceleration to be directly obtained without demodulation, however these signals delivered by the detecting means are demodulated to obtain the signals corresponding to the speed of rotation.

The controlling and processing unit can also comprise means for amplifying said signals.

Another subject-matter of the present invention is a system for detecting accelerations in two different directions and a speed of rotation along two different directions, comprising at least two detecting devices according to the invention.

The opposite phase mechanical coupling means are advantageously common to both detecting devices. The opposite phase mechanical coupling means can be formed by four beams assembled as a rhomb, both structures of each device being connected to the rhomb at two vertices located on the same diagonal of the rhomb.

Another subject-matter of the present invention is a system for detecting accelerations in three different directions and a speed of rotation along three different directions, comprising two detecting systems according to the present invention, said systems being oriented with respect to each other such that the accelerations in the three directions and the speeds of rotation along the three directions are detected.

Another subject-matter of the present invention is a system for detecting accelerations in three different directions and a speed of rotation along three different directions, comprising four detecting devices according to the present invention.

The opposite phase coupling means are advantageously common to the four detecting devices.

The opposite phase mechanical coupling means are for example formed by four beams arranged as a rhomb, two structures of two different detecting devices being connected to a vertex of the rhomb, both structures of a same device being connected to two vertices located on the same diagonal of the rhomb.

Another subject-matter of the present invention is a system for detecting accelerations in three different directions and a speed of rotation along three different directions, comprising a detecting system according to the present invention and further an accelerometer and a gyrometer.

Another subject-matter of the present invention is a method for detecting an acceleration or speed of rotation from a detecting device according to the present invention, comprising the steps of:

exciting excitation masses by the excitation means, detecting the displacement of the detecting element by the detecting means, processing the detecting signals of each of the detecting elements, determining the acceleration or speed of rotation.

The processing step can comprise a sub-step of demodulating the signals and a sub-step of summing and subtracting the signals of each of the detecting elements.

BRIEF DESCRIPTION OF THE DRAWINGS

The present invention will be better understood using the description that follows and the appended drawings wherein.

DETAILED DISCLOSURE OF PARTICULAR EMBODIMENTS

In the description that follows, the terms "sensor", "detecting device" and "inertial unit" are used interchangeably.

The orientations of directions X, Y and Z are identical throughout the figures.

By way of example, the axes X, Y and Z are defined as follows:
- the axes X and Y define the plane of the inertial unit, in the representations, these are contained in the sheet plane, direction X is the horizontal direction, direction Y is the vertical direction and
- the axis Z is perpendicular to the unit plane, and to the sheet plane in the representations.

It is reminded that when:
- the direction of excitation is direction X and the direction of detection is direction Z, the acceleration is detected along direction Z and the speed of rotation along direction Y,
- the direction of excitation is direction X and the direction of detection is direction Y, the acceleration is detected along direction Y and the speed of rotation along direction Z,
- the direction of excitation is direction Z and the direction of detection is direction Y, the acceleration is detected along direction Y and the speed of rotation along direction X.

Figure 1:
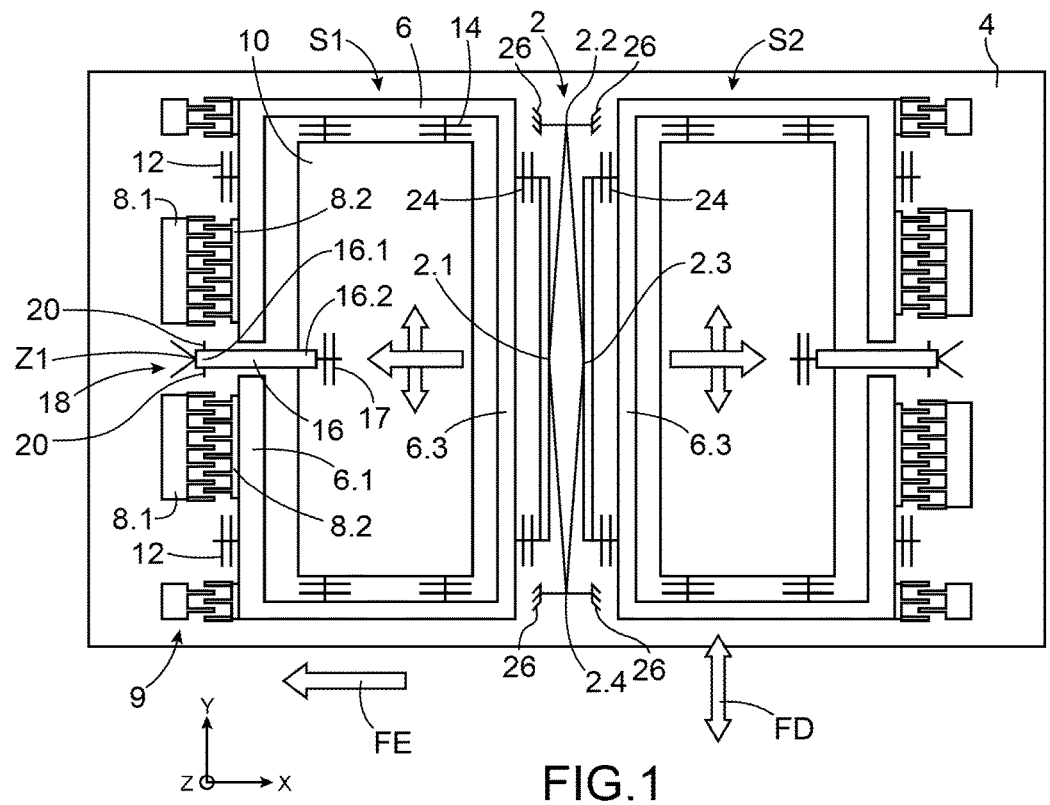
FIG. 1 is a schematic representation of an exemplary embodiment of an inertial unit capable of measuring an in-plane acceleration and an out-of-plane speed of rotation, in a top view.

In FIG. 1, a top view can be seen of an exemplary embodiment of an inertial unit able to detect an acceleration along Y and a speed of rotation along Z.

The unit of FIG. 1 comprises two structures S1, S2 mechanically coupled by elastic means 2.

Both structures S1 and S2 are moveably mounted on a support 4. The structures S1 and S2 are similarly made, only the structure S1 will be described in detail.

The structure S1 comprises several parts being moveable between them. The structure S1 comprises a first part, called an excitation mass 6 associated with excitation means 8 along direction X, an inertial unit 10 associated with a detecting part and detecting means 11.

The excitation mass 6 is intended to be moved along axis X by the excitation means. The inertial part 10 is intended to be moved by an acceleration along axis Y or a speed of rotation about axis Z, its movement is then detected by the detecting means 11.

The excitation mass 6 will also be referred to as "excitation mass" and the inertial part 10 will also be called "inertial mass".

In the example represented, the excitation mass 6 is formed by a frame suspended to the support 4 by elastic means 12. The excitation means 8 are, in the example represented, of the electrostatic type and comprise pairs of interdigitated combs 8.1, 8.2. A comb 8.1 of each pair is carried by the support 4 and the other comb 8.2 of each pair is carried by the frame such that the teeth of the combs of a pair are interdigitated. The application of a voltage between the combs of each pair causes electrostatic forces to appear between the teeth, the combs to move closer or away and the frames to be moved along the axis X.

Detecting electrodes 9 are also advantageously provided between the excitation mass 6 and the support 4 for detecting the excitation movement of the excitation mass and forming a feedback loop. In the example represented, the electrodes 9 are in the form of interdigitated combs on either side of the excitation combs.

The combs 8.1, 8.2 are provided on an edge of the frame perpendicular to direction X so as to cause a displacement of the frame 6 along direction X.

It can be considered to implement other excitation means, such as piezoelectric or magnetic type means.

In the example represented, the inertial part 10 is in the form of a rectangular parallelepiped mounted in the excitation mass 6 and is suspended to the same by suspending means 14. Thus, the excitation movements of the excitation mass are transmitted to the inertial part 10, which can however have its own movement along the axis Y or Z.

The detecting part is formed by a detecting arm 16, coupled by one end 16.1 to the inertial part 10 by elastic means 17, and rotatably moveable by a pivot connection 18 about an axis Z1 parallel to the axis Z with respect to the support 4 by a second end 16.2.

The pivot connection is, in the example represented, formed by two in-plane flexible beams, attached by an end to the support 4 at two distinct points and by another end to the detecting arm 16 and defining the pivot axis Z1 at the intersection of the axis of the beams. This configuration has the advantage of offering a pure or nearly pure rotation of the detecting arm about the axis Z1.

The detecting means comprise a pair of piezoresistive gauges 20 provided between the support 4 and the detecting arm 16 perpendicular to the longitudinal axis X of the detecting arm 16 such that the rotation displacement of the detecting arm 16 about the pivot of axis Z1, causes the compression of one of the gauges 20 and the extension of the other gauge 20. The bias of the gauges then enables the displacement of the detecting arm 16 and thus of the inertial part 10 to be determined. In the example represented, both gauges 20 are advantageously mounted as a differential, which enables the effect of temperature variations to be overcome. The pairs of gauges 20 are for example connected as a bridge, for example a Wheatstone bridge. It could also be foreseen to only use a single piezoresistive gauge, provided as either of the gauges 20. Advantageously and as is represented in FIG. 1, the gauge(s) 20 is (are) located closest to the pivot axis Z1 such that the gauges are maximally stressed.

As indicated above, the structure S2 is similar to the structure S1. Both structures S1 and S2 are provided one next to the other so as to be symmetrical one to the other with respect to a plane parallel to the plane YZ. Thus, the posts 6.3 of the frames which are not provided with combs are parallel and facing each other.

The coupling means 2 of both structures connect both excitation parts 6. These are provided between both structures and are connected to the posts 6.3 of the excitation masses 6.

The coupling means 2 are such that they provide an opposite phase coupling, i.e. when the masses are excited, they move away from or closer to each other in phase.

Advantageously, the coupling means provide a strong coupling. By "strong coupling", between two moveable masses, it is meant a mechanical connection such that if a first mass is displaced by an amplitude A0, inducing a displacement of the second mass by an amplitude A1, and then that the second mass is displaced by an amplitude A1 inducing a movement of an amplitude A2 on the first mass, the amplitudes A0 and A2 are substantially the same.

A weak coupling is also worth considering.

In the example represented, the coupling means 2 comprise a closed structure of beams in a rhomb shape, two opposite vertices 2.1, 2.3 being connected to the excitation parts 6 of each of the structures, via beams 24 which are connected by elastic means 24 to the edges 6.3.

The two other vertices 2.2, 2.4 are connected to beams 26 anchored to the substrate at their end. The coupling means 2 are deformed along the axis X and enable the excitation masses 6 and the inertial masses 10 to move away from and closer to each other along the axis X.

The excitation means and the strain gauges 20 are connected to a controlling and processing unit (not shown) in order to control the excitation parts 6 and process the measurements transmitted by the gauges 20 and deduce the acceleration or speed of rotation therefrom. The controlling and processing unit will be described below.

The operation of the sensor of FIG. 1 will now be explained.

The arrow FE symbolises the excitation movement and the arrow FD symbolises the detection movement.

A voltage is applied to the interdigitated combs 8.1, 8.2, and as a result, electrostatic forces appear and the excitation masses 6 are moved along direction X. The excitation masses 6 transmit the excitation movement to the inertial masses 10 through the suspending means 14.

An acceleration aY along direction Y or a speed of rotation ΩZ about the axis Z generates a force in the centre of the masses along the axis Y. This force moves the inertial masses 10 along direction Y.

The excitation signals of both excitation masses 6 are such that the excitation masses are excited in opposite phase, the excitation parts 6 move away from or closer to each other in phase.

Because of this excitation in opposite phase and the coupling means 2, an acceleration in direction Y drives both inertial masses 10 in the same direction. Whereas the Coriolis forces used to measure a speed of rotation drive both inertial masses 10 along direction Y in an opposite direction.

The arms 16 are thus rotated about their pivot connection 18 but in an opposite direction. This rotation is transmitted to the gauges 20 which undergo for the first one a compressive strain and for the other one a tensile strain. These strains cause resistance variations in the piezoresistive gauges 20.

The responses sent by each pair of gauges 20 to the controlling and processing unit are thus opposite.

In the table below, the influence of an acceleration and a speed of rotation on each of the gauge bridges are collected. It is considered that both gauge bridges provide signals having an identical absolute value.

| | Gauge bridge of the structure 1 $\Delta R_1$ | Gauge bridge of the structure 2 $\Delta R_2$ | Accelerometer signal $\Delta R_1 + \Delta R_2$ | Gyroscopic signal $\Delta R_1 - \Delta R_3$ |
|---|---|---|---|---|
| Acceleration along Y | ↑ | ↑ | ↑ | 0 |
| Speed of rotation along Z | ↑ | ↓ | 0 | ↑ |

The direction of the arrow symbolises the influence of the acceleration and the speed of rotation on the gauge bridges. In the case of an acceleration along Y, the influence is the same on both gauge bridges and in the case of a speed of rotation, the influences are opposite. Since both detecting arms 16 have the same movement amplitude, in the case of an acceleration along Y, the influences are added together, and in the case of a speed of rotation, the influences are subtracted from each other and cancel each as other.

Thus, thanks to the invention, it is possible with the same reading electronics to measure an acceleration and a speed of rotation and to discriminate the signals very simply. The design is thus more compact.

Further, this sensor has a reduced 1/f noise.

Figure 2:
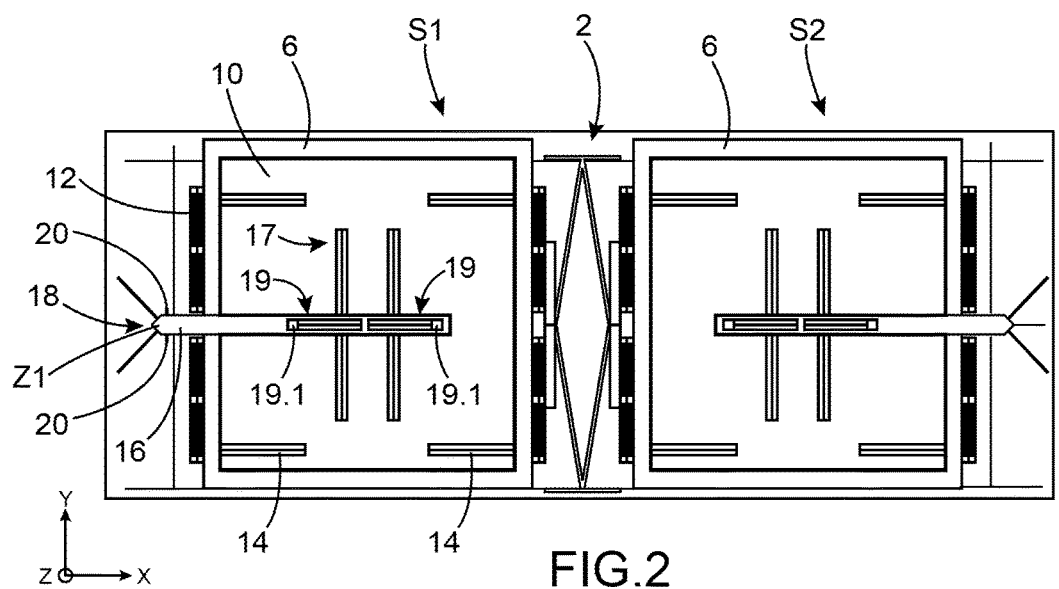
FIG. 2 is a top view representation of a practical embodiment of the inertial unit of FIG. 1, FIGS. 3A and 3B are exemplary embodiments of elastic means for connecting two moveable parts to each other and a moveable part to the support respectively.

In FIG. 2, a practical embodiment of the inertial unit of FIG. 1 can be seen allowing a detection of an in-plane acceleration of the unit and a detection of an out-of-plane speed of rotation, i.e. along the axis Z.

The references of FIG. 1 will be the same for common elements. The excitation means are not represented but are for example of the interdigitated combs type.

In this embodiment, the suspending means 14 of the inertial part connect the inertial part to the posts 6.1, 6.3 of the excitation mass 6.

Figure 3A:
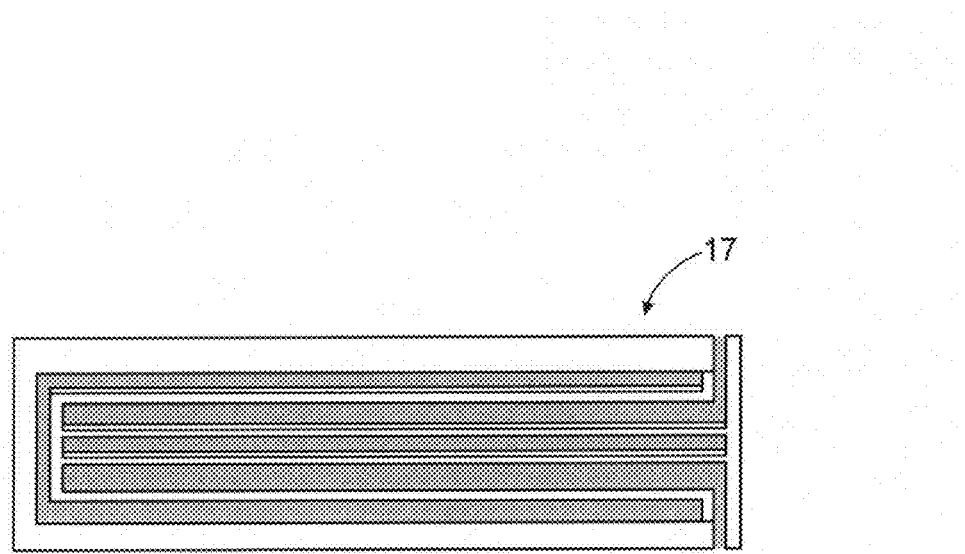

The inertial part 10 is connected to the detecting arm 16 by elastic means 17, for example of the type of those represented in FIG. 3A. Advantageously, two pairs of springs connect the inertial part to the arm, which improves the symmetry in transmission. The implementation of these means enables only the movement in direction Y of the inertial part to be transmitted to the detecting arm 16, and not the movement in direction X.

Advantageously, the detecting arm 16 is itself connected to the support 4 by two elastic means 19 anchored to the support 4 by an anchor stud 19.1, which enables the movement of the detecting arm 16 to be cancelled along X. For example, these elastic means 19 are also of the type of those of FIG. 3A.

Figure 3B:
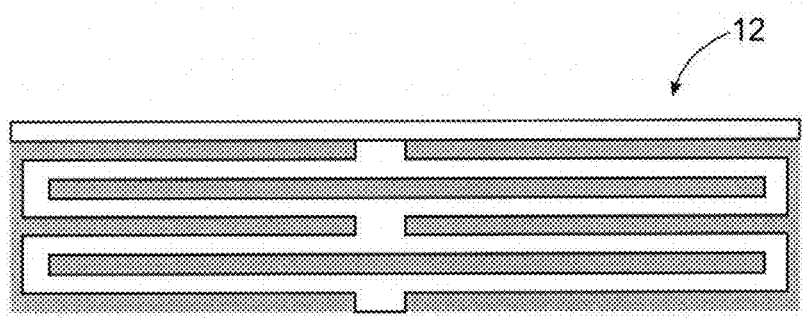

The suspending means 12 of the excitation mass 6 are for example of the type of those represented in FIG. 3B.

In FIGS. 3A and 3B, exemplary embodiments of elastic means connecting the different parts of each of the structures can be seen.

In FIG. 3A, this is a so-called "folded spring", which is connected by a longitudinal end to the detecting arm and comprises two blades connected to the inertial mass, and in FIG. 3B, this is also a spring called U-shaped spring, wherein the connecting ends are located on the flanks of greater length. Both these elastic means can be used indiscriminately. These elastic means are means well known to those skilled in the art and will not be described in detail.

Advantageously, the sensitivity of the detection signal is amplified if the resonance frequency of the detecting part or element is close or even equal to the resonance frequency of the excitation part.

Other arrangements between the excitation part, the inertial mass and the detecting mass are worth considering without departing from the scope of the present invention.

Figure 16A:
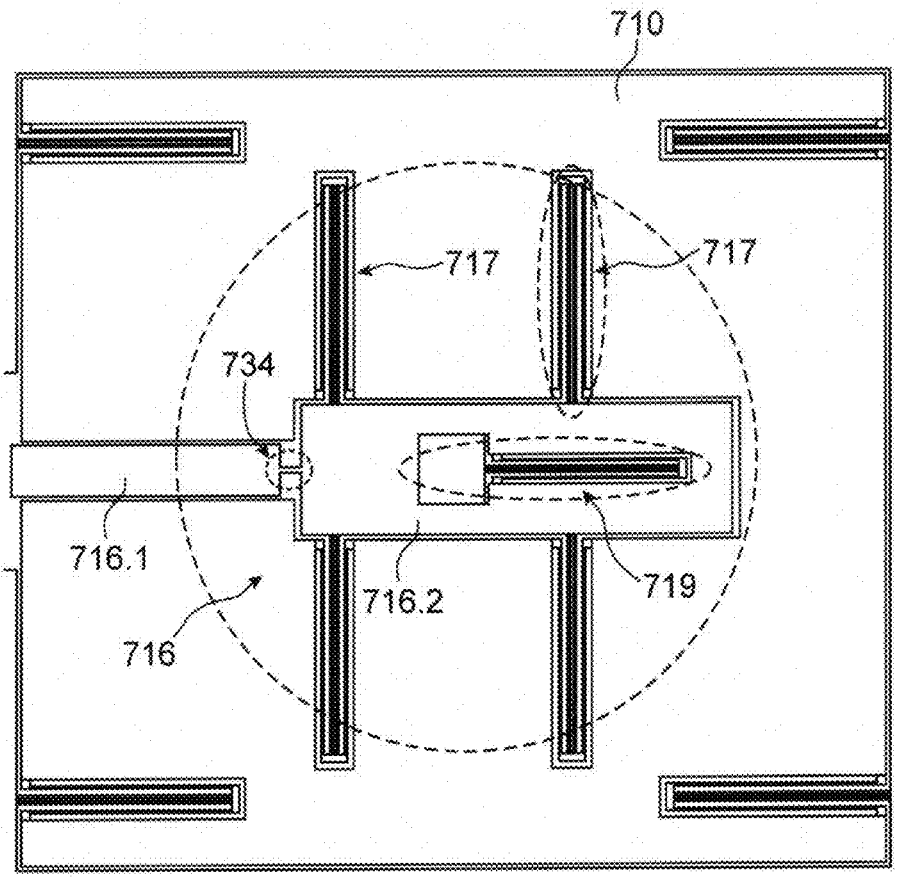
FIG. 16A is a detail view of an exemplary particularly advantageous embodiment of a detecting element in the case of an in-plane displacement.
Figure 16B:
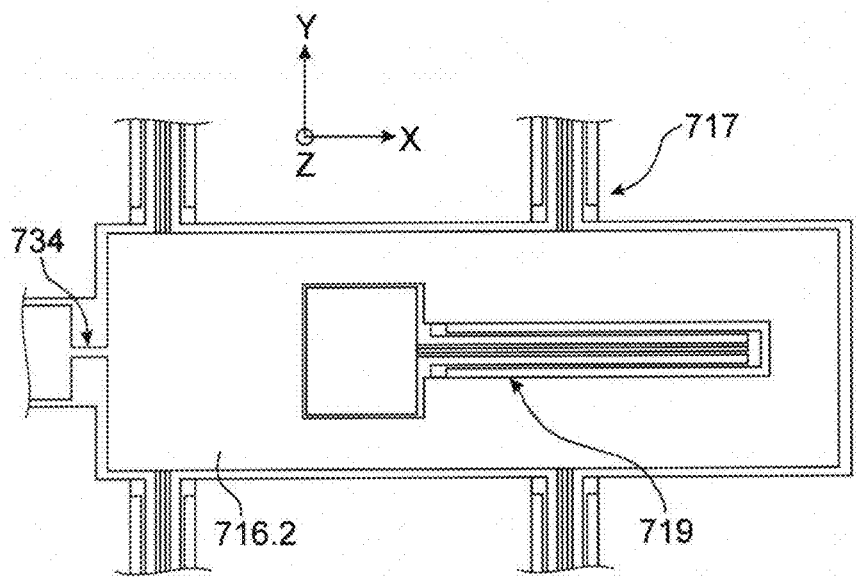
FIG. 16B is a magnified view of FIG. 16A.

In FIGS. 16A and 16B, an exemplary particularly advantageous embodiment of an inertial unit able to detect an in-plane acceleration and an out-of-plane speed of rotation providing an increased sensitivity can be seen. This unit is distinct from that of FIG. 2 in that the detecting element 716 comprises two portions 716.1, 716.2 connected by a pivot connection 734 having an axis perpendicular to the plane of the unit and parallel to the pivot connection between the support and the detecting element 716 (not represented). The first portion 716.1 is rotatably hinged to the support and the second portion 716.2 is connected by elastic means 717 to the inertial part 710.

In the example represented, the pivot connection 734 is formed by a beam having a reduced width able to bend about an axis perpendicular to the unit plane. The pivot connection 734 enables the translation movement of the inertial part 710 along the axis Y to be transformed into a rotation movement about the pivot connection 718, thus offering a greater mobility to the first detecting portion 716.1. The unit sensitivity is thus increased.

The elastic means 717 are similar to those represented in FIGS. 3A and 3B, they enable only the movement in direction Y of the inertial part, and not the movement in direction X to be transmitted to the detecting element 716.

The elastic means 719 enable the movement of the detecting element 716 along X to be cancelled.

Figure 4:
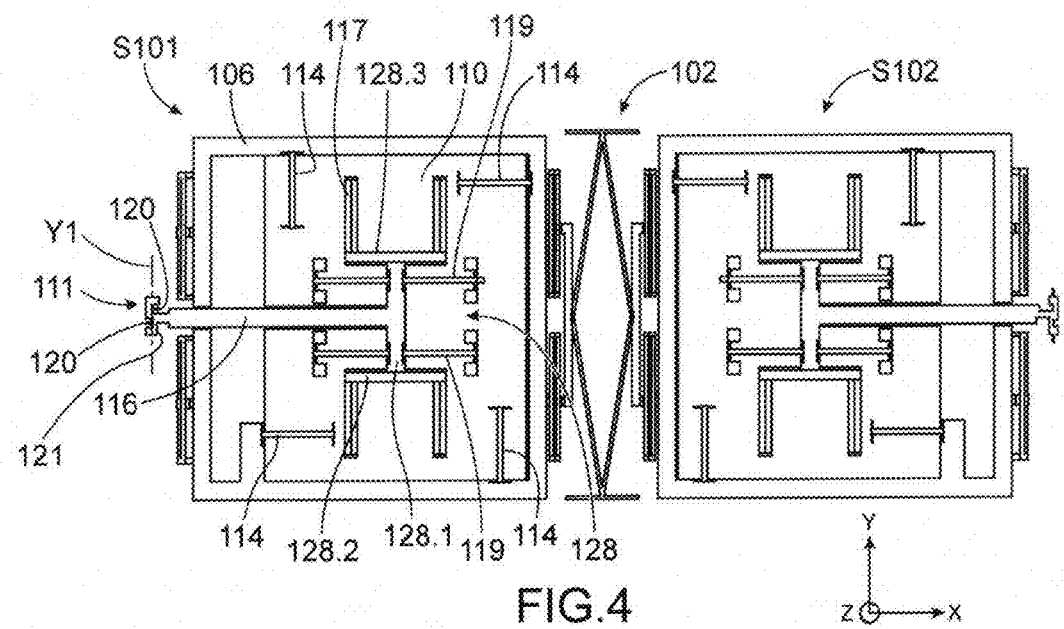
FIG. 4 is a top view of an inertial unit capable of measuring an out-of-plane acceleration and an in-plane speed of rotation.

In FIG. 4, an exemplary embodiment of an inertial unit able to detect an out-of-plane acceleration and an in-plane speed of rotation.

The inertial unit is made such that the detecting parts can have an out-of-plane displacement, i.e. along direction Z and not along direction X or Y.

For this, the suspending elastic means have been changed with respect to those of the example of FIG. 2, so as to allow out-of-plane displacements and exert a spring force onto the detecting parts 116 to the rest position. The suspending elastic means 114 are formed for example by four beams each connected by an end to an internal face of the frame of the excitation mass 106 and by another end to the moveable mass 110. The beams are stressed in bending. Besides, the detecting arms 116 are rotatably moveable with respect to the support about the axis Y1 parallel to the axis Y.

In the example represented, the detecting arm 116 is connected at its end to the inertial part 110 so as to allow only the transmission of out-of-plane movements. The mechanical connection between the detecting arm 116 and the inertial part 110 is made through an I-shaped part, the I-end bases 128.2, 128.3 of which are each connected to the inertial part by two springs 117 enabling a displacement of the inertial part 110 along the axis Z and an in-plane displacement of the detecting arm 116 without disturbing the displacement of the inertial part 110 and without deforming the detecting arm 116. Further, two pairs of elastic means 119 connect the I body to the support. The movement along the direction of excitation is not transmitted to the detecting arm 116.

Besides, the detecting arm comprises at its longitudinal end hinged to the support a shaft 121 perpendicular to the longitudinal axis of the detecting arm 116 and having the same axis as the axis of rotation of the detecting arm. The detecting means 111 comprise gauges 120 connected to the shaft 121 and oriented along X. The shaft comprises two thinned ends intended to be deformed in torsion about the axis of rotation. As in FIGS. 1 and 2, both gauges are arranged with respect to the axis of rotation so as to be stressedly biased, when a first one undergoes a tensile strain, the other one undergoes a compressive strain.

The operation of the unit of FIG. 4 is similar to that of the unit of FIGS. 1 and 2.

Figure 5:
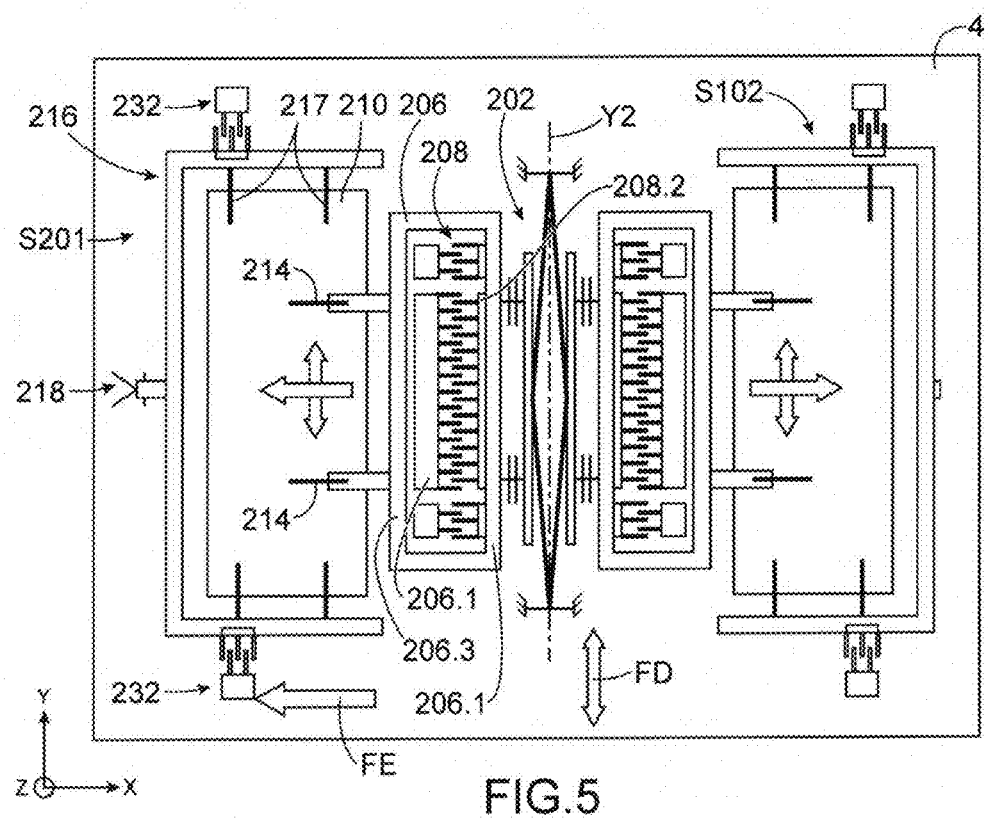
FIG. 5 is a schematic representation of another exemplary embodiment of an inertial unit capable of measuring an in-plane acceleration and an out-of-plane speed of rotation, in a top view.

In FIG. 5, another exemplary embodiment of an inertial unit can be seen. In this example, the excitation mass and the inertial mass are juxtaposed in the plane XY and the excitation means are located in the centre of the unit.

As in the previous examples, the unit comprises two structures S201, S202 symmetrical with respect to a plane passing through axis Y2.

Both structures S201, S202 are coupled by elastic means 202 similar to those described in connection with FIG. 1.

The structure S201 comprises an excitation mass 206 in the form of a frame. The excitation means 206 which are of the electrostatic type are located inside the frame. A comb 208.1 is made on the support and extends parallel to axis Y, and a comb 208.12 is made in an internal face of a post 206.1 of the frame of the excitation mass 206.

The inertial mass 210 in the form of a rectangular parallelepiped is located next to the excitation mass 206. The excitation mass and the inertial mass are connected by elastic means 214 enabling the inertial part 210 to be displaced along direction Y with respect to the excitation mass 206.

Further, the detecting arm 216 is in a U-shape surrounding the three sides of the inertial part 210 which are not connected to the excitation mass 206. The U-shaped detecting arm 216 is connected by elastic means 217 to the sides of the inertial mass which are parallel to direction X.

Further, the U-shaped detecting arm is rotatably moveable on the support 4 by a pivot connection 218 having an axis parallel to direction Z. The pivot connection is located in the centre of the U bottom of the element 230.

The arrows FE symbolise the excitation movement and the arrow FD symbolises the detection movement.

The structure S202 is identical to the structure S201. The coupling means 202 are connected to the excitation parts, more particularly to the posts 206.1.

Counter-electrodes 232, as interdigitated combs, are advantageously provided between the U-shaped element 216 and the support.

This exemplary embodiment makes the integration of counter-electrodes easier.

In this exemplary embodiment, the electrical connections of the combs are made by TSV (Through Silicon Via) type vias.

Figure 17A:
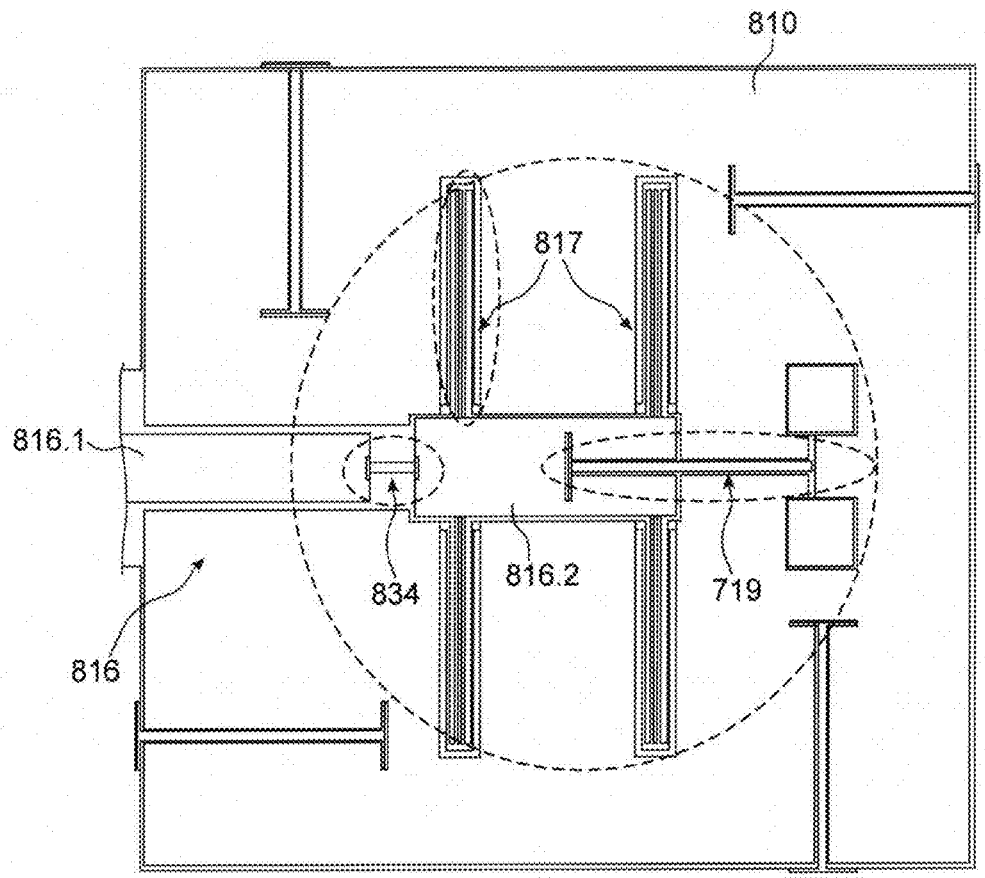
FIG. 17A is a detail view of an exemplary particularly advantageous embodiment of a detecting element in the case of an out-of-plane displacement.
Figure 17B:
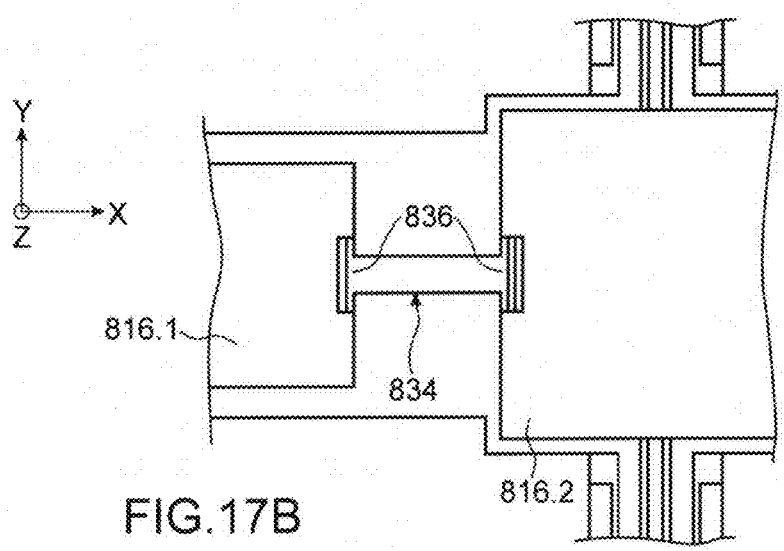
FIG. 17B is a magnified view of FIG. 17A.

In FIGS. 17A and 17B, an exemplary advantageous embodiment of an inertial unit able to detect an out-of-plane acceleration and an in-plane speed of rotation presenting an increased sensitivity can be seen. This unit is different from that of FIG. 4 in that the detecting element 816 comprises two portions 816.1, 816.2 connected by a pivot connection 834 having an axis parallel to the plane of the unit and parallel to the pivot connection between the support and the detecting element 816 (not shown). The first portion 816.1 is rotatably hinged on the support and the second portion is connected by elastic means 817 to the inertial part 810.

In the example represented, the pivot connection 834 is formed by a beam having an axis X hinged at its two longitudinal ends to the two portions 816.1, 816.2 by deformable beams 836 of axis Y. The pivot connection enables the translation movement of the inertial part 810 along axis Z to be transformed into a rotation movement about the pivot connection 818, then presenting a greater mobility to the first detecting portion 816.1. The sensitivity of the unit is thus increased.

The elastic means 817 are similar to those represented in FIGS. 3A and 3B, they enable only the movement in direction Z of the inertial part, and not the movement in direction X to be transmitted to the detecting element 816.

The elastic means 819 enable the movement of the detecting element 816 along X to be cancelled. In this example, the elastic means 819 are similar to those of the unit of FIG. 4.

Figure 6A:
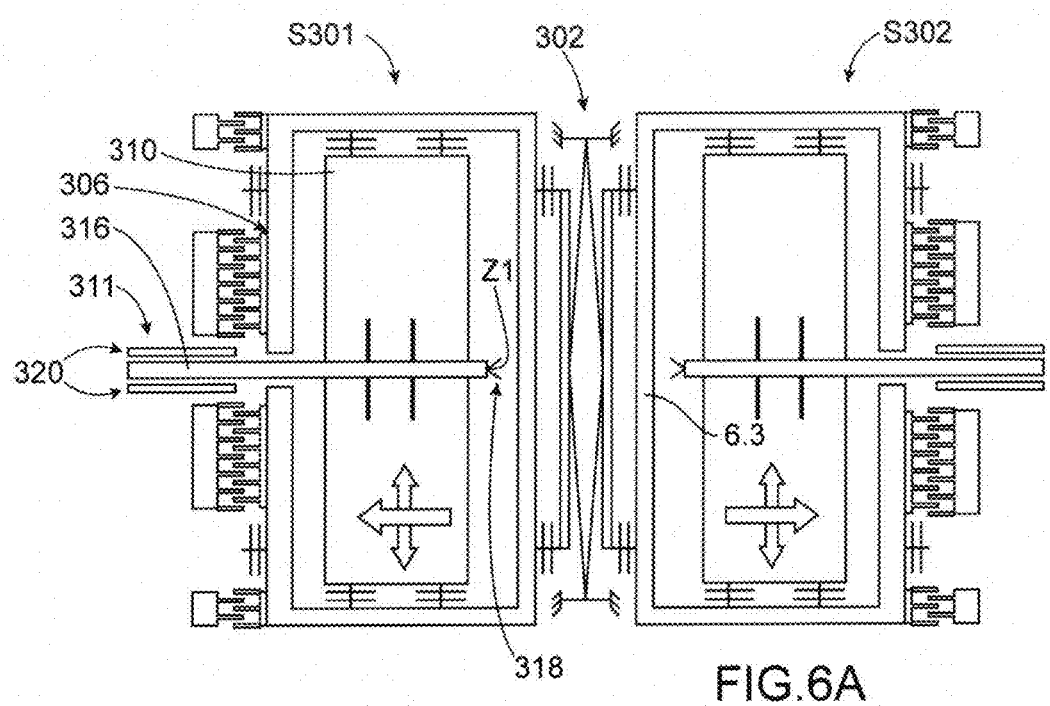
FIG. 6A is a schematic representation of an exemplary embodiment of an inertial unit capable of measuring an in-plane acceleration and an out-of-plane speed of rotation implementing capacitive detecting means, in a top view.

In FIG. 6A, another exemplary embodiment of an inertial unit which is different from that of FIG. 1 in that the detecting means are of the capacitive and not piezoresistive type can be seen.

The capacitive detecting means 311 comprise two electrodes 320 provided on either side of the detecting arm and defining with the detecting arm two variable capacitors C1, C2.

These capacitive means can be adapted to the unit of FIG. 1.

Very advantageously, and as can be seen in FIG. 6A, the electrodes are provided as far as possible from the pivot connection 318 of the detecting arm 316 such that the displacement of the part of the detecting arm which is located between the electrodes 320 is maximum in order to have a maximum capacitance variation.

In FIG. 6A, the pivot connection 318 of the detecting arm 316 is located inside the frame of the excitation mass 306 on the side of the coupling means 302, the detecting arm 316 extending on either side of the inertial mass 310. The electrodes 320 are arranged opposite the pivot connection 318 with respect to the inertial part 310 and surround the free end of the beam 316.

Alternatively, a single electrode could be used, but as for the piezoresistive gauges, a differential mounting enables temperature variations to be overcome.

An inertial unit wherein the detecting elements are connected to the support by mechanical connections other than a pivot connection does not depart from the scope of the present invention. Further, as is illustrated by the unit of FIG. 6B, no direct mechanical connection between the detecting elements and the support are provided, in particular in the case of a capacitive type detecting element.

Figure 6B:
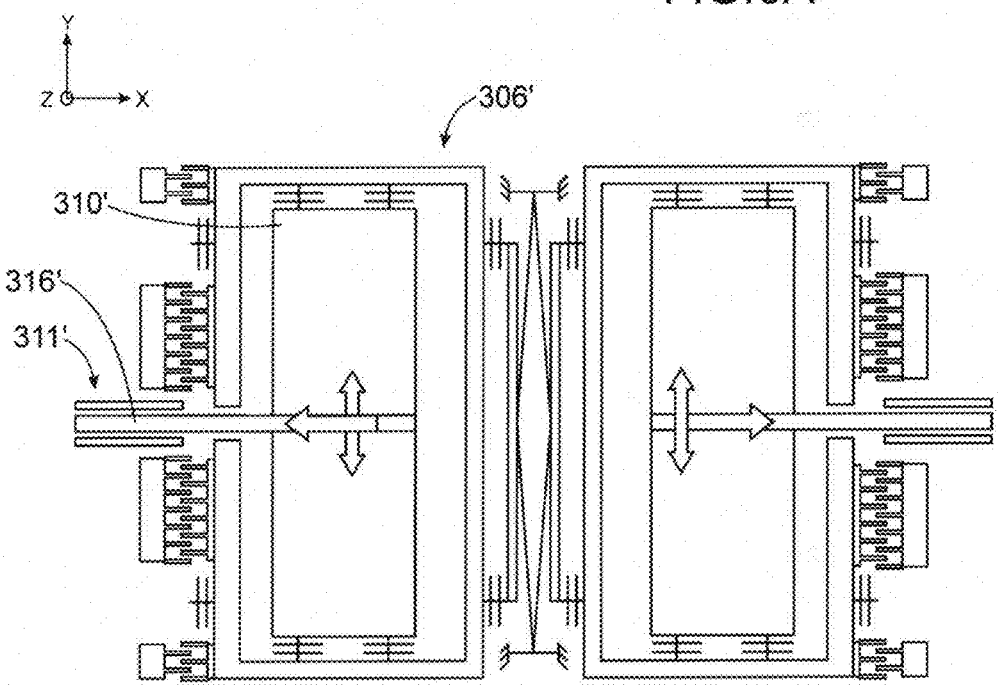
FIG. 6B is a schematic representation of another exemplary embodiment of an inertial unit capable of measuring an in-plane acceleration and an out-of-plane speed of rotation implementing capacitive detecting means, in a top view, wherein an inertial mass and a detecting element are the same.

In FIG. 6B, another exemplary embodiment of an inertial unit implementing capacitive type detecting means can be seen.

The unit of FIG. 6B is different from that of FIG. 6A in that the detecting element 316' and the inertial mass 310' are the same so as to form a single piece. The inertial mass 310' is suspended inside the excitation mass 306'. The detecting arm 316' forms one of the electrodes of the capacitive detecting means 311'. In this example, the detecting arm 316' is not directly mechanically connected to the support.

Figure 15:
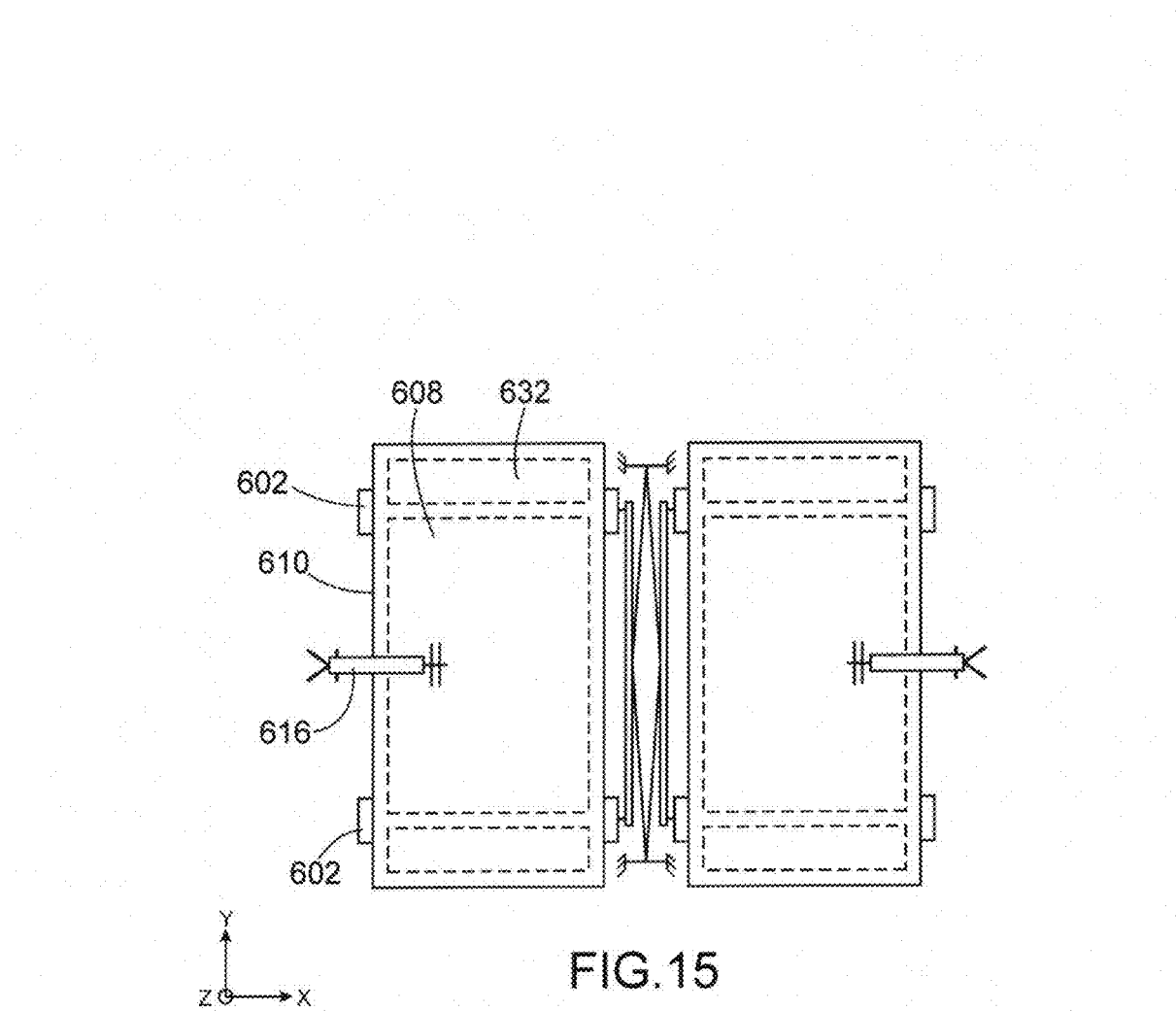
FIG. 15 is a top view of an inertial unit capable of moving the excitation mass in direction Z for detecting the acceleration along axis Y and the speed of rotation along axis X.

In FIG. 15, another exemplary embodiment can be seen of a capable inertial unit wherein the excitation mass is moved in direction Z, and the acceleration is detected along axis Y and the speed of rotation is detected along axis X.

In this exemplary embodiment, the inertial mass and the excitation mass are the same and are designated 610, the detecting element is formed by an arm 616. The excitation electrode 608 located under the excitation mass in a centre part thereof and the detecting electrodes 632 of the excitation located under the excitation mass on either side of the excitation electrode are represented as a dashed line.

Guide springs 602 along direction Z are provided, they have some flexibility along direction Z and some stiffness along directions X and Y.

In this exemplary embodiment, the excitation is directly made on the inertial mass.

A measure of the speed of rotation modulated at the excitation frequency and a measure of the non-modulated acceleration are then obtained.

The present invention allows to make an inertial unit able to measure an in-plane acceleration and an out-of-plane speed of rotation and an inertial unit able to measure an out-of-plane acceleration and an in-plane speed of rotation. It is thus possible to make detecting systems able to measure accelerations in at least two space directions and speeds of rotation along at least two space directions.

Figure 7:
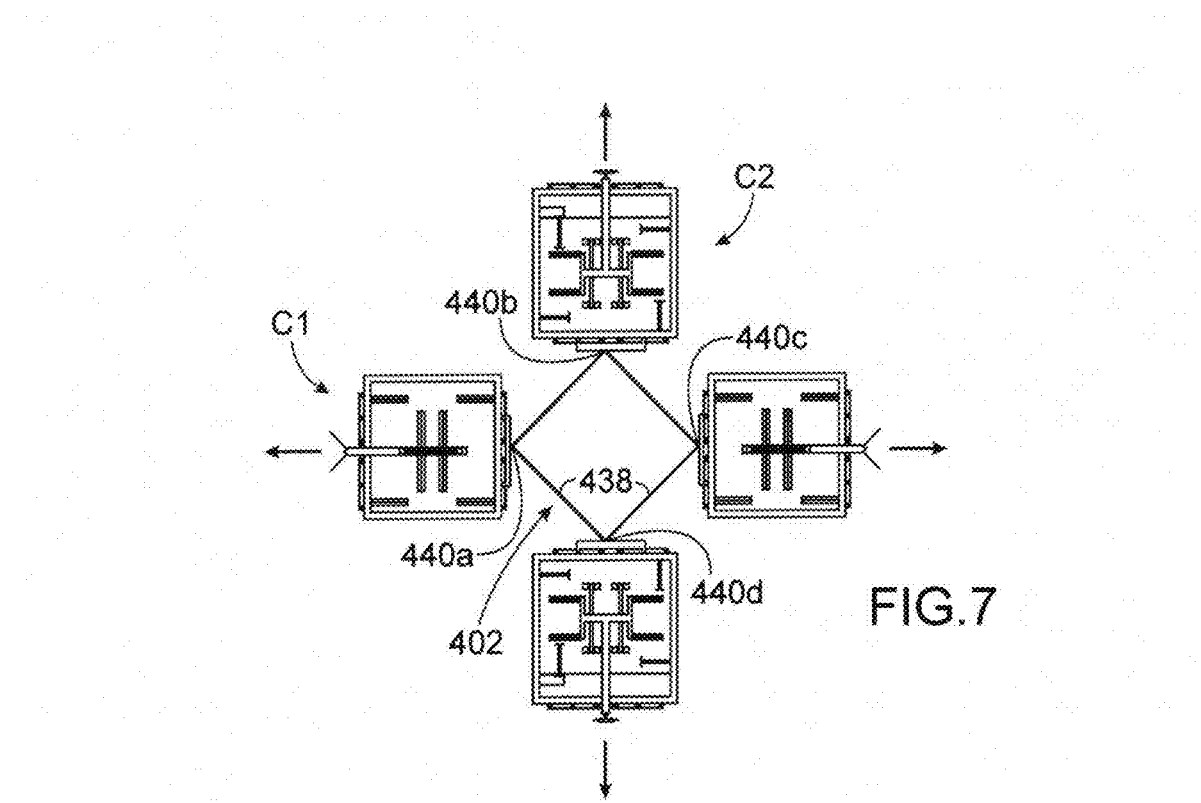
FIG. 7 is a top view of an exemplary embodiment of an inertial unit able to measure an acceleration in two directions and a speed of rotation in two directions.

In FIG. 7, an exemplary embodiment of a detecting system able to detect an acceleration aY along direction Y, an out-of-plane acceleration aZ, an out-of-plane speed of rotation $\Omega Z$ and an in-plane speed of rotation $\Omega X$ can be seen.

The detecting system of FIG. 7 comprises two sensors C1, C2 according to the invention.

The coupling means 402 are common to both sensors C1 and C2, and provide an opposite phase mechanical coupling.

In the example represented, the mechanical coupling means 2 are formed by a structure of four beams 438 forming a rhomb each vertex 440a to 440d of which is connected to a structure of a sensor.

The sensor C1 enables an acceleration aY along direction Y, an out-of-plane speed of rotation $\Omega Z$ to be detected. In the example represented, it is similar to that of FIG. 2. The sensor C2 enables an out-of-plane acceleration aZ and an in-plane speed of rotation $\Omega X$ to be detected. In the example represented, it is similar to that of FIG. 4. The excitation means are not represented, but they are similar to those described in connection with FIG. 1.

Upon operating the detecting system, both excitation parts of the sensors C1 and C2 are moved, but a single excitation loop is required.

The above device thus enables the acceleration along Y and Z and the speed of rotation along X and Z to be measured while having a single excitation loop.

The rhomb shaped coupling spring enables both the excitation electronics, since a single excitation loop is implemented, and the device area to be minimised.

All the measurements are dynamically made, that is the signal to be detected is modulated at the excitation frequency. Indeed, the signal measured on the four pairs of gauges will be identical in terms of frequency spectrum and information.

Preferably, the system is sized so as to obtain the resonance frequencies of the excitation system and detecting systems as close as possible to each other. At this frequency, the system offers the highest responses, which enables the device sensitivity to be optimised.

Figure 8:
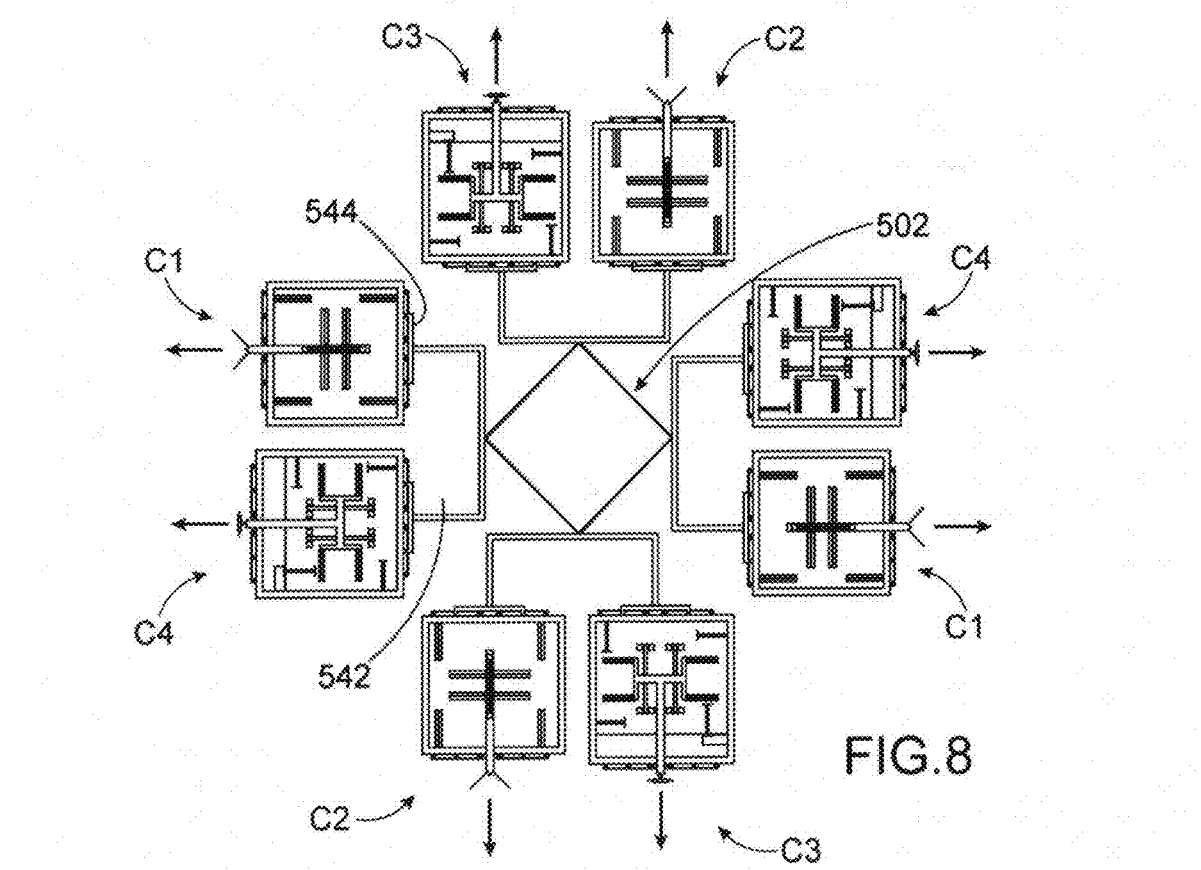
FIG. 8 is a top view of an exemplary embodiment of an inertial unit able to measure an acceleration in three directions and a speed of rotation in three directions.

In FIG. 8, a detecting system able to detect accelerations along three space directions, as well as speeds of rotation in the three space directions to be detected.

The detecting system comprises four sensors mechanically coupled by a coupling means 502 similar to that of FIG. 7.

Each vertex is connected to two structures of two different sensors. For this, both structures are connected to a beam 542 by elastic means 544, the beam being connected to the rhomb vertex.

In the example represented, the structures of each sensor are arranged such that they are not located on the same side of the rhomb diagonal connecting the vertices to which they are connected, but this arrangement is not limiting.

The arrows symbolise the excitation movements. The sensor C1 measures aY and ΩZ, the sensor C2 measures aX and ΩZ, the sensor C3 measures aZ and ΩX and the sensor C4 measures aZ and ΩY.

The accelerations and speeds of rotation are actually measured along the three directions. A redundancy in the measurement of the out-of-plane accelerations and speeds of rotation will be noted.

Also in this detecting system, a single excitation loop is required, the excitation electronics is thus reduced, as well as the power consumption.

Figure 9:
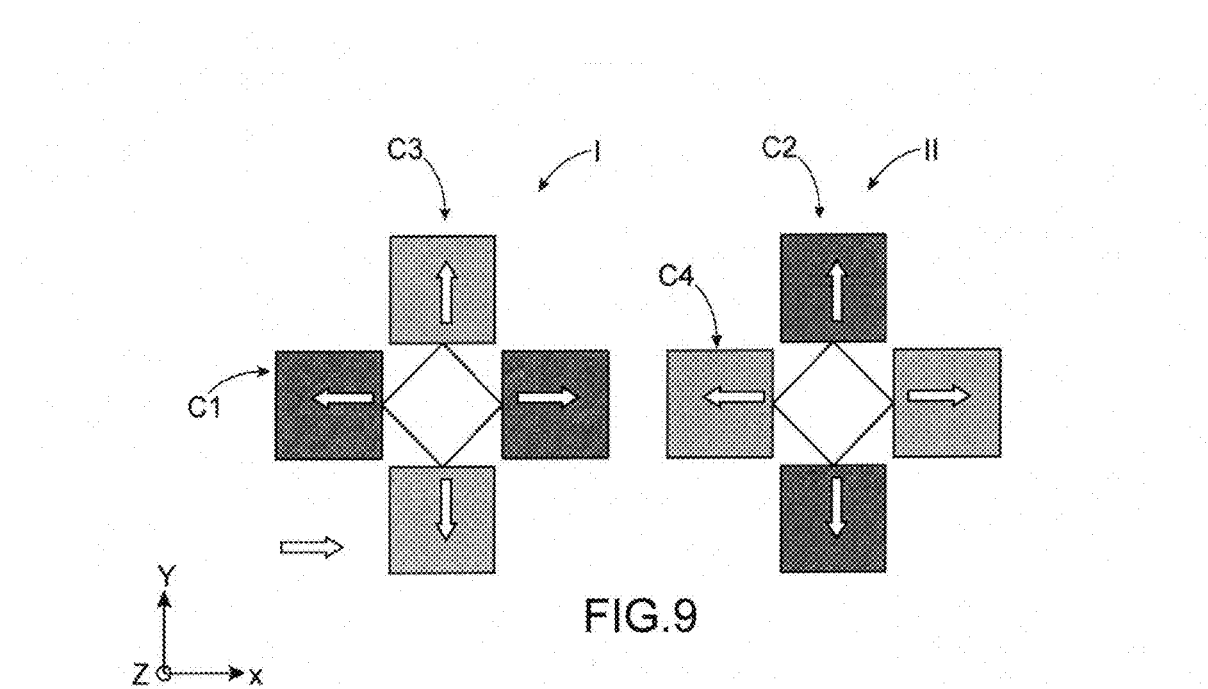
FIG. 9 is a schematic top view of another exemplary embodiment of an inertial unit able to measure an acceleration in three directions and a speed of rotation in three directions.

In FIG. 9, another exemplary embodiment of a detecting system enabling accelerations and speeds of rotation along the three directions can be seen.

The detecting system comprises two systems enabling accelerations into two different directions and two speeds of rotation along two different directions to be measured so as to have the measurement in the three directions.

The system 1 couples a sensor C1 of aY and ΩZ and a sensor C3 of aZ and ΩX.

The system II couples a sensor C2 of aX and ΩZ and a sensor C4 of aZ and ΩY.

Both systems are oriented with respect to each other such that the axis of a sensor of one of the systems measuring an in-plane acceleration, for example aY is orthogonal to the axis of the sensor of the other system measuring the other acceleration in the plane aX.

Figure 10:
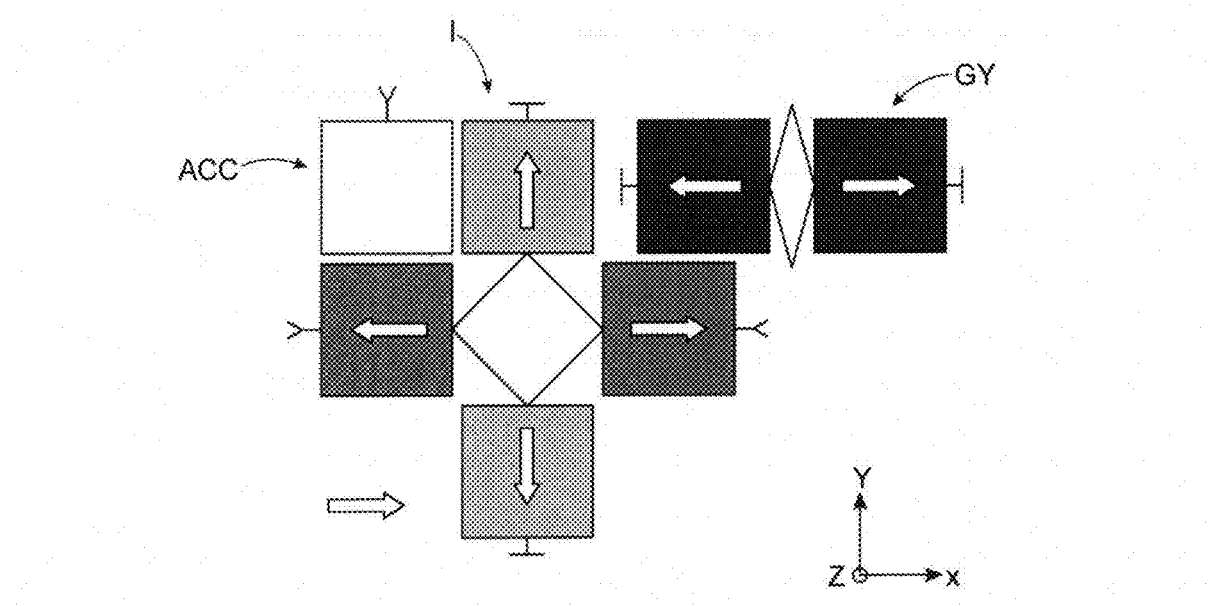
FIG. 10 is a schematic top view of another exemplary embodiment of an inertial unit able to measure an acceleration in three directions and a speed of rotation in three directions.

In FIG. 10, another exemplary embodiment of a system for detecting accelerations and speeds of rotation along the three directions offering a more compact design in terms of area can be seen.

The detecting system of FIG. 10 comprises one of the detecting systems of FIG. 9, an accelerometer ACC measuring the acceleration in the missing direction and a gyrometer GY measuring a speed of rotation along the missing direction.

The detecting system similar to the system I of FIG. 9 measures aY, aZ, ΩZ and ΩX, the accelerometer ACC measures aX, and the gyrometer GY measures ΩY.

The arrows symbolise the direction of excitation.

The accelerometer can be of the passive type, or of the dynamic type, with an excitation loop.

The gyrometer is of the type known to those skilled in the art.

This detecting system therefore implements at least two excitation loops, an excitation loop for the system I and an excitation loop for the gyrometer, possibly a third one in the case of a dynamic accelerometer.

An example of processing the signals delivered by the gauges in the case of a piezoelectric detection will now be described.

The piezoresistive gauges from the electrical point of view can be considered as resistors the value of which is modulated and which vary with the intensity of the physical quantities measured.

Figure 11A:
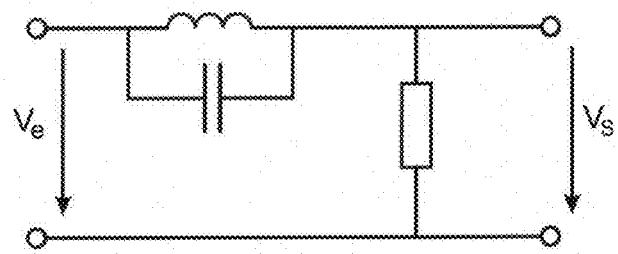
FIGS. 11A, 11B, 12 and 13 are exemplary circuits used for processing detecting signals.
Figure 11B:
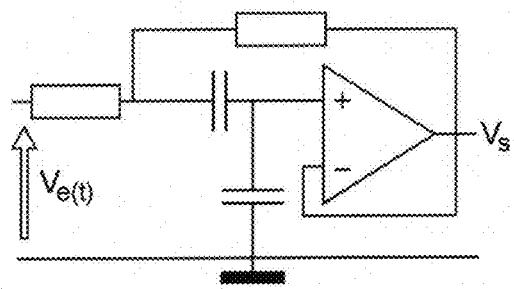
Figure 13:
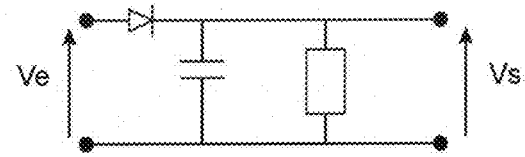

In a first processing step, the signals emitted by the gauges undergo a demodulating step, the signals being all modulated at the same frequency, being the excitation frequency. This demodulating step can be performed by a dedicated filter such as a passive pass-band filter in FIG. 11A or such that the active pass-band filter of FIG. 11B, or by a measuring instrument such as a lock-in amplifier for example SR830. For filters having high selectivities, only a low bandwidth comprising the frequency of the signal carrier will be transmitted. The high frequency component is then filtered using an envelope detector, formed for example by a diode coupled to a low pass filter (FIG. 13). Ve and Vs are the input and output voltages respectively.

Advantageously, prior to this first step, the signals are amplified.

During a subsequent step, in the case of the acceleration, the signals provided by the gauge bridges are added enabling a signal of an amplitude proportional to the acceleration to be obtained.

In the case of the speed of rotation, the signals provided by the gauge bridges are subtracted enabling a signal of an amplitude proportional to the speed of rotation to be obtained.

Figure 12:
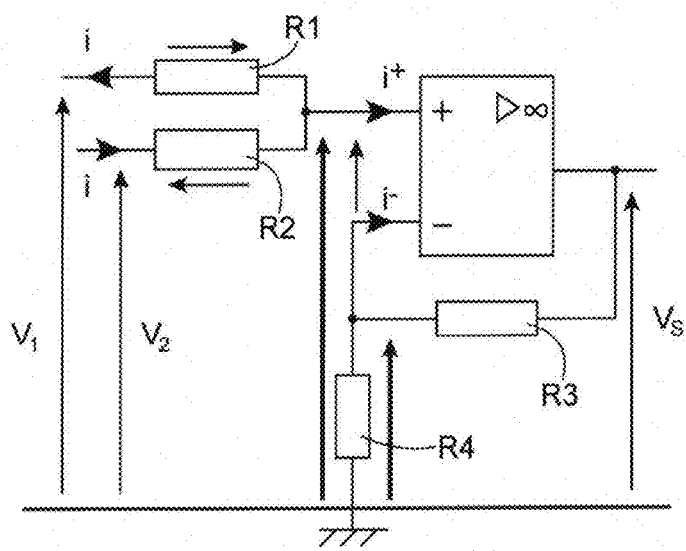

In FIG. 12, an exemplary wiring diagram of a non-inverting summing arrangement performing the addition or subtraction of the signals from the bridge middles.

The controlling and processing unit thus comprises means for demodulating the signal and means for summing the demodulated signals. Preferably, the controlling unit also comprises means for amplifying the signals prior to the demodulation thereof.

Such a unit is advantageously made as a microelectromechanical and/or a nanoelectromechanical system with microelectronics techniques.

An example of such a method for making an inertial unit with electrostatic excitation and piezoelectric detection will now be described using FIGS. 14A to 14I.

Figure 14A:
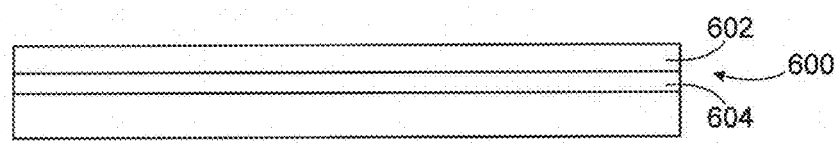
FIGS. 14A and 14I are schematic representations of different steps of an exemplary method for making an inertial unit according to the invention.

A SOI ("Silicon on oxide") substrate 600 is used, comprising a typical silicon thickness 602 in front face between 5 μm and 100 μm and a typical buried oxide thickness 604 between 0.5 μm and 5 μm (FIG. 14A).

During a first step, a thinning of the silicon layer 602 is carried out up to about 400 nm, the layer 604 having a thickness of 1 μm. The element thus obtained is represented in FIG. 14A.

During a subsequent step, an implantation of dopants is carried out into the layer 602 and an homogenisation of the dopants is made throughout the thickness of the silicon of the layer 602 by annealing, for example at 1 050° C. for 5 min.

Figure 14B:
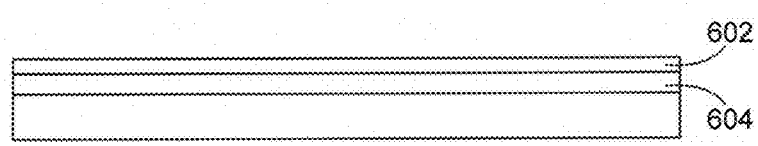

The element thus obtained is represented in FIG. 14B.

Then, a thinning of the silicon layer 602 is performed up to about 250 nm.

During a subsequent step, a lithography of the layer 602 is performed to define the gauges 20. An etching of the layer 602 with stopping on the oxide layer 604 is performed. Thus, a step of removing the lithography mask is performed.

Figure 14C:
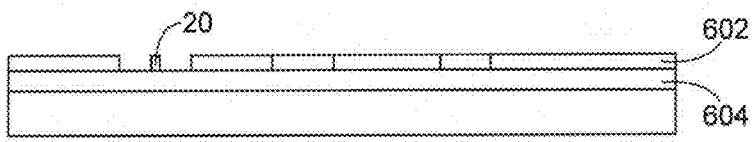

The element thus obtained is represented in FIG. 14C.

During a subsequent step, a gauge protecting layer is made for example by depositing 250 nm thick $SiO_2$ 606, for example by high density plasma (HDP).

Figure 14D:
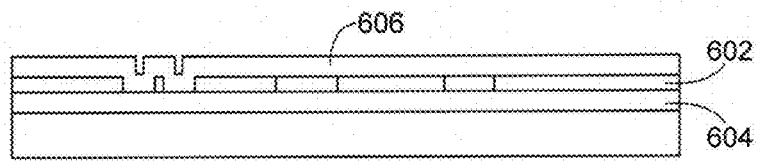

The element thus obtained is represented in FIG. 14D.

During a subsequent step, the so-called protection level lithography is made. Then, an etching of the $SiO_2$ layer 606 is performed with stopping on the layer 602. Then, a lithography mask removal step is performed. An anisotropic etching based on bombarding ions from a fluorinated gas will be used.

Figure 14E:
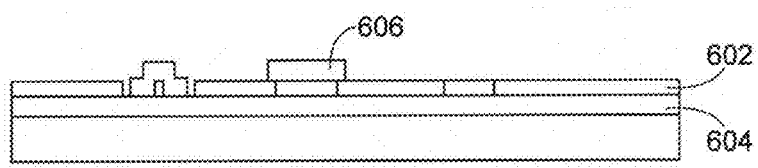

The element thus obtained is represented in FIG. 14E.

During a subsequent step, a Si layer 608 is deposited through a 20 μm epitaxy, preferably four layers of 5 μm each are made. A chemical mechanical polishing step then occurs.

Figure 14F:
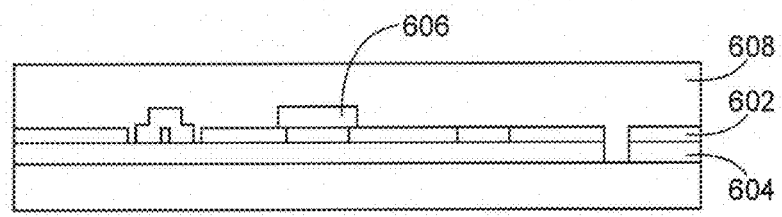

The element thus obtained is represented in FIG. 14F.

During a subsequent step, a step of implanting dopant of the front face 610 of the layer 608 and homogenising through annealing is performed.

Then, to form the electrical contacts, a deposition of a metal layer 612 for example of 650 nm AlSi is performed. Then, an etching of the layer 612 is made. Then, a lithography mask removal step is performed.

Figure 14G:
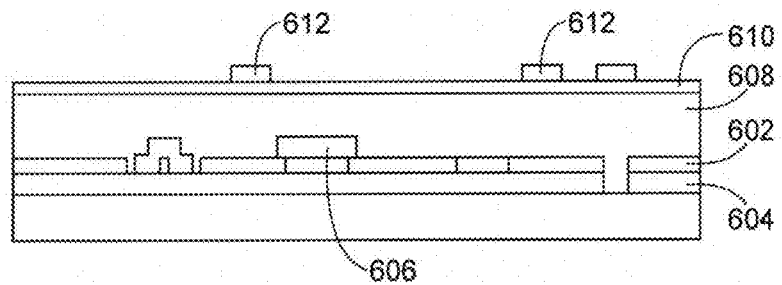

The element thus obtained is represented in FIG. 14G.

During a subsequent step, a lithography is performed to define the masses, and the layer 608 is etched for example by deep reactive-ion etching (DRIE). The lithography mask is then removed.

Figure 14H:
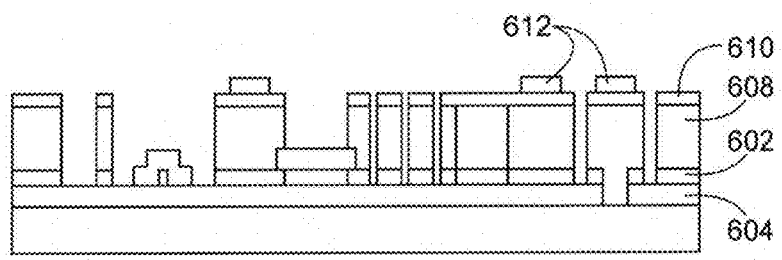

The element thus obtained is represented in FIG. 14H.

During a last step, the structures are released for example with hydrofluoric acid over time.

Figure 14I:
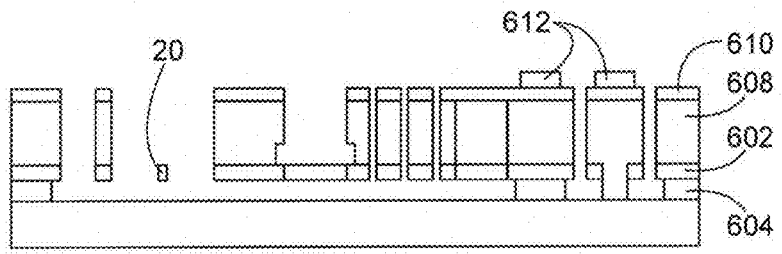

The inertial unit according to the invention thus obtained is represented in FIG. 14I.

The present invention provides an inertial unit able to measure an acceleration and a speed of rotation having a compact design, a high performance and a simplified operation.

The invention claimed is:

1. A device for detecting an acceleration in at least one direction and a speed of rotation in at least one other direction, comprising:
    a support and at least two structures mechanically coupled to each other in opposite phase, the structures being suspended relative to the support, each of the structures comprising:
        an excitation mass;
        an excitation means configured to move the excitation mass in a given direction of excitation;
        an inertial mass mechanically integral with the excitation mass;
        a detecting element connected to the inertial mass to be displaced by the inertial mass, the detecting element being hinged to the support by a first pivot connection and connected to the inertial mass by elastic means;
        a detector detecting displacement of the inertial mass in a given direction of detection; and
    a unit for controlling the excitation means and processing signals delivered by the detector.

2. The device for detecting according to claim 1, wherein the detecting element comprises a first portion and a second portion that are connected by a second pivot connection, the first portion being hinged to the support by the first pivot connection, and the second portion being connected to the inertial mass by the elastic means, the second pivot connection having an axis between the first and second portions that is parallel to another axis of the first pivot connection between the support and the first portion.

3. The device for detecting according to claim 1, wherein the inertial mass and the detecting element associated therewith of each of the structures are connected to transmit movements along a direction of detection to the detecting element, the inertial mass of each of the structures being configured to be displaced along a direction contained in a neutral plane of the device for detecting.

4. The device for detecting according to claim 3, wherein the first pivot connection between the detecting element and the support is formed by two flexible beams in the neutral plane, attached by one end to the support at two distinct points and by another end to the detecting element and defining a pivot axis at an intersection of an axis of the flexible beams.

5. The device for detecting according to claim 1, wherein the inertial mass and the detecting element associated therewith of each of the structures are connected to transmit movements in a direction of detection to the detecting element, the inertial mass of each of the structures being configured to be displaced along a direction perpendicular to a neutral plane of the device for detecting.

6. The device for detecting according to claim 5, wherein the first pivot connection between the detecting element and the support is formed by a beam attached to the detecting element and by two ends to the support, said first pivot connection allowing the detecting element to move out of the neutral plane.

7. The device for detecting according to claim 1, comprising the elastic means anchored to the support and connected to the detecting element.

8. The device for detecting according to according to claim 1, wherein for each of the structures, the inertial mass and the detecting element or the inertial mass and the excitation mass are the same.

9. The device for detecting according to claim 1, wherein both of the structures are mechanically coupled in opposite phase by a rhomb-shaped connection, the structures being connected at two vertices thereof connected by a diagonal of a rhomb.

10. The device for detecting according to claim 1, wherein, for each of the structures, the excitation mass is in a shape of a frame inside which is suspended the inertial mass, and wherein the detecting element is an arm connected to the inertial mass.

11. The device for detecting according to claim 1, wherein the detector comprises at least one piezoresistive gauge connected to the detecting element.

12. The device for detecting according to claim 11, wherein the detector comprises two piezoresistive gauges mounted as a differential.

13. The device for detecting according to claim 1, wherein the detector is of capacitive type, and comprises at least one electrode, the detecting element forming with the electrode a variable capacitor.

14. The device for detecting according to claim 13, wherein the detector comprises two electrodes between which is accommodated the detecting element, the detecting element forming with each of the electrodes a variable capacitor.

15. The device for detecting according to claim 13, wherein the capacitive detector is located opposite a pivot connection with respect to the inertial mass.

16. The device for detecting according to claim 1, wherein, for each of the structures, the excitation means is of electrostatic type comprising at least one pair of inter-digitated combs per excitation mass, a first comb being on the support and a second comb being integral with the excitation mass.

17. The device for detecting according to claim 1, being a microelectromechanical system and/or a nanoelectromechanical system.

18. The device for detecting according to claim 1, wherein the unit for controlling the excitation means and processing the signals delivered by the detector comprises a demodulator for demodulating the signals and means for summing and subtracting the demodulated signals.

19. The device for detecting according to claim 18, wherein the controlling and processing unit also comprises an amplifier for amplifying the signals.

20. A system for detecting accelerations in two different directions and a speed of rotation along two different directions, comprising at least two devices for detecting according to claim 1.

21. The system for detecting according to claim 20, comprising opposite phase mechanical coupling means common to both devices for detecting.

22. The system for detecting according to claim 21, wherein the opposite phase mechanical coupling means is formed by four beams assembled as a rhomb, both structures of each device being connected to the rhomb at two vertices located on a same diagonal of the rhomb.

23. A system for detecting accelerations in three different directions and a speed of rotation along three different directions, comprising two systems for detecting according to claim 20, the systems being oriented with respect to each other such that accelerations in the three directions and speeds of rotation along the three directions are detected.

24. A system for detecting accelerations in three different directions and a speed of rotation along three different directions, comprising a system for detecting according to claim 20 and further an accelerometer and a gyrometer.

25. A system for detecting accelerations in three different directions and a speed of rotation along three different directions, comprising four devices for detecting according to claim 1.

26. The system for detecting accelerations in three different directions and a speed of rotation along three different directions according to claim 25, comprising opposite phase mechanical coupling means common to the four devices for detecting.

27. The system for detecting according to claim 26, wherein the opposite phase mechanical coupling means is formed by four beams arranged as a rhomb, two structures of two different detecting devices being connected to a vertex of the rhomb, both structures of a same device being connected to two vertices located on a same diagonal of the rhomb.

* * * * *